US010140889B2

(12) United States Patent
Black et al.

(10) Patent No.: US 10,140,889 B2
(45) Date of Patent: Nov. 27, 2018

(54) HERNIA MODEL

(71) Applicant: Applied Medical Resources Corporation, Rancho Santa Margarita, CA (US)

(72) Inventors: Katie Black, Rancho Santa Margarita, CA (US); Tracy Breslin, Rancho Santa Margarita, CA (US); Nikolai Poulsen, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 197 days.

(21) Appl. No.: 15/196,551

(22) Filed: Jun. 29, 2016

(65) Prior Publication Data

US 2016/0328999 A1    Nov. 10, 2016

Related U.S. Application Data

(63) Continuation of application No. 14/278,929, filed on May 15, 2014, now Pat. No. 9,449,532.
(Continued)

(51) Int. Cl.
*G09B 23/28* (2006.01)
*G09B 23/30* (2006.01)
*G09B 23/34* (2006.01)

(52) U.S. Cl.
CPC .......... *G09B 23/30* (2013.01); *G09B 23/285* (2013.01); *G09B 23/34* (2013.01)

(58) Field of Classification Search
USPC ................. 434/262, 267, 268, 272
See application file for complete search history.

(56) References Cited

U.S. PATENT DOCUMENTS

| 184,573 A | 11/1876 | Becker |
|---|---|---|
| 2,127,774 A | 8/1938 | Jacobson |

(Continued)

FOREIGN PATENT DOCUMENTS

| CN | 2421706 Y | 2/2001 |
|---|---|---|
| CN | 2751372 Y | 1/2006 |

(Continued)

OTHER PUBLICATIONS

The International Bureau of WIPO, International Preliminary Report on Patentability for International Application No. PCT/US2016/036664, entitled "Hysterectomy Model," dated Dec. 21, 2017, 10 pgs.

(Continued)

*Primary Examiner* — Kurt Fernstrom
(74) *Attorney, Agent, or Firm* — Patrick Y. Ikehara

(57) ABSTRACT

A model for practicing transabdominal pre-peritoneal (TAPP) and total extraperitoneal (TEP) approaches for laparoscopic hernia repairs is provided. The model simulates an insufflated space between the abdominal muscles and peritoneum. A spring layer may be incorporated to provide a realistic resiliency to the model while in the simulated insufflated configuration. At least one hole is provided in the model from which synthetic tissue protrudes to simulate a hernia. The model is used to selectively simulate direct, indirect and femoral inguinal hernias as well as incisional hernias by removably placing the protruding simulated tissue into any one of several openings. The model contains all important anatomical structures and sits on a base frame or is connected to a rigid simulated pelvis. When located inside a laparoscopic trainer with an angled top cover, the model provides an ideal simulation for teaching and practicing laparoscopic hernia repair.

12 Claims, 11 Drawing Sheets

Related U.S. Application Data

(60) Provisional application No. 61/823,834, filed on May 15, 2013, provisional application No. 61/973,999, filed on Apr. 2, 2014.

(56) References Cited

U.S. PATENT DOCUMENTS

| | | |
|---|---|---|
| 2,284,888 A | 6/1942 | Arneil, Jr. |
| 2,324,702 A | 7/1943 | Hoffman et al. |
| 2,345,489 A * | 3/1944 | Lord .................. G09B 23/32 434/272 |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A * | 6/1999 | Goldfarb .............. G09B 23/285 434/272 |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |

(56) References Cited

U.S. PATENT DOCUMENTS

| | | | |
|---|---|---|---|
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 * | 10/2012 | Park ............ G09B 23/34 434/262 |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 * | 12/2013 | Hendrickson ........ G09B 23/303 434/267 |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 * | 7/2014 | Pravong ............ G09B 23/285 434/262 |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 2/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |

(56) References Cited

U.S. PATENT DOCUMENTS

| | | |
|---|---|---|
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0324541 A1 | 12/2010 | Whitman |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1* | 6/2012 | Hori .................. G09B 23/30 434/272 |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1* | 9/2014 | Shim .................. G09B 23/34 434/272 |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0133158 A1 | 5/2016 | Sui et al. |

(56) References Cited

U.S. PATENT DOCUMENTS

| | | |
|---|---|---|
| 2016/0140876 A1 | 5/2016 | Jabbour et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2909427 Y | 6/2007 |
| CN | 101313842 A | 12/2008 |
| CN | 201364679 Y | 12/2009 |
| CN | 201955979 U | 8/2011 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 103886797 A | 6/2014 |
| DE | 41 05 892 | 8/1992 |
| DE | 44 14 832 | 11/1995 |
| DE | 19716341 C2 | 9/2000 |
| EP | 1 024 173 A1 | 8/2000 |
| FR | 2 691 826 | 12/1993 |
| FR | 2 917 876 | 12/2008 |
| FR | 2 917 876 A1 | 12/2008 |
| GB | 2488994 A | 9/2012 |
| JP | 10 211160 | 8/1998 |
| JP | 2001005378 A | 1/2001 |
| JP | 2009236963 A | 10/2009 |
| JP | 3162161 U | 8/2010 |
| JP | 2013127496 A | 6/2013 |
| MX | PA 02004422 A | 11/2003 |
| PT | 106230 | 9/2013 |
| WO | WO 1994/06109 A1 | 3/1994 |
| WO | WO 1996/042076 A1 | 12/1996 |
| WO | WO 1998/58358 A1 | 12/1998 |
| WO | WO 1999/01074 A1 | 1/1999 |
| WO | WO 2000/36577 | 6/2000 |
| WO | WO 2002/38039 A2 | 5/2002 |
| WO | WO 2002/038039 A3 | 5/2002 |
| WO | WO 2004/032095 A1 | 4/2004 |
| WO | WO 2004/082486 A1 | 9/2004 |
| WO | WO 2005/071639 A1 | 8/2005 |
| WO | WO 2006/083963 A2 | 8/2006 |
| WO | WO 2007/068360 | 6/2007 |
| WO | WO 2008/021720 A2 | 2/2008 |
| WO | WO 2009/000939 | 12/2008 |
| WO | WO 2009/089614 A1 | 7/2009 |
| WO | WO 2010/094730 | 8/2010 |
| WO | WO 2011/035410 A1 | 3/2011 |
| WO | WO 2011/046606 A1 | 4/2011 |
| WO | WO 2011/151304 A1 | 12/2011 |
| WO | WO 2012/149606 A1 | 11/2012 |
| WO | WO 2012168287 A1 | 12/2012 |
| WO | WO 2012175993 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2015/14881 A1 | 10/2015 |
| WO | WO 2016/183412 A1 | 11/2016 |
| WO | WO 2016/201085 A1 | 12/2016 |

OTHER PUBLICATIONS

European Patent Office, Examination Report for European Application No. 14733949.3 titled "Gallbladder Model," dated Dec. 21, 2016, 6 pgs.

European Patent Office, The International Search Report and Written Opinion of the International Searching Authority for International Application No. PCT/US2016/062669 titled "Simulated Dissectible Tissue," dated Apr. 5, 2017, 19 pgs.

European Patent Office, The International Search Report and Written Opinion of the International Searching Authority for International Application No. PCT/US2017/020389 titled "Simulated Tissue Cartridge", dated May 24, 2017, 13 pgs.

The International Bureau of WIPO, International Preliminary Report on Patentability and Written Opinion for International Application No. PCT/US2015/059668, entitled "Simulated Tissue Models and Methods," dated May 26, 2017, 16 pgs.

The International Bureau of WIPO, International Preliminary Report on Patentability for International Application No. PCT/US2016/041852, entitled "Simulated Dissectible Tissue," dated Jan. 25, 2018, 12 pgs.

European Patent Office, Extended European Search Report for European Patent Application No. EP 17202365.7, titled "Gallbladder Model", dated Jan. 31, 2018, 8 pgs.

The International Bureau of WIPO, International Preliminary Report on Patentability for International Application No. PCT/US2016/043277, entitled "Appendectomy Model," dated Feb. 1, 2018, 9 pgs.

The International Bureau of WIPO, International Preliminary Report on Patentability for International Application No. PCT/US2016/018697, entitled "Simulated Tissue Structures and Methods," dated Aug. 31, 2017, 14 pgs.

Limps and Things, EP Guildford Mattu Hernia Trainer, http://limbsandthings.com/us/products/tep-guildford-mattu-hernia-trainer/, printed May 29, 2014, 11 pgs.

Simulab, Hernia Model, http://www.simulab.com/product/surgery/open/hernia model, printed printed May 29, 2014, 4 pgs.

McGill Laparoscopic Inguinal Hernia Simulator, Novel Low-Cost Simulator for Laparoscopic Inguinal Hernia Repair, Feb. 8, 2011, 1 pg.

University of Wisconsin—Madison Biomedical Engineering, Inguinal Hernia Model, http://bmedesign.engr.wisc.edu/projects/s10/hernia_model/, printed May 29, 2014, 62 pgs.

European Patent Office, The International Search Report and Written Opinion of the International Searching Authority for International Application No. PCT/US2014/048027, titled "First Entry Model", dated Oct. 17, 2014, 10 pgs.

European Patent Office, The International Search Report and Written Opinion for International Application No. PCT/US2014/042998, titled "Gallbladder Model," dated Jan. 7, 2015, 20 pgs.

The International Bureau of WIPO, International Preliminary Report on Patentability, for PCT application No. PCT/US2013/053497, titled, Simulated Stapling and Energy Based Ligation for Surgical Training, dated Feb. 12, 2015, 6 pgs.

The International Bureau of WIPO, International Preliminary Report on Patentability for International Application No. PCT/US2013/062363, titled Surgical Training Model for Laparoscopic Procedures, dated Apr. 9, 2015, 9 pgs.

The International Bureau of WIPO, International Preliminary Report on Patentability for International Application No. PCT/US2013/062269, titled Surgical Training Model for Laparoscopic Procedures, dated Apr. 9, 2015, 6 pgs.

The International Bureau of WIPO, International Preliminary Report on Patentability for International Application No. PCT/US2013/061557, titled Surgical Training Model for Laparoscopic Procedures, dated Apr. 9, 2015, 6 pgs.

The International Bureau of WIPO, International Preliminary Report on Patentability for International Application No. PCT/US2013/061728, titled Surgical Training Model for Laparoscopic Procedures, dated Apr. 9, 2015, 7 pgs.

The International Bureau of WIPO, International Preliminary Report on Patentability for International Application No. PCT/US2013/061949, titled Surgical Training Model for Laparoscopic Procedures, dated Apr. 9, 2015, 6 pgs.

(56) References Cited

OTHER PUBLICATIONS

The International Bureau of WIPO, International Preliminary Report on Patentability for International Application No. PCT/US2014/019840, titled "Simulated Tissue Structure for Surgical Training" dated Sep. 11, 2015, 8 pgs.
European Patent Office, The International Search Report and Written Opinion for International Application No. PCT/US2015/020574, titled "Advanced First Entry Model for Surgical Simulation," dated Jun. 1, 2015, 12 pgs.
European Patent Office, The International Search Report and Written Opinion for International Application No. PCT/US2015/022774, titled "Simulated Dissectible Tissue," dated Jun. 11, 2015, 13 pgs.
Anonymous: Silicone rubber—from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, titled Hernia Model, dated Nov. 26, 2015, 16 pgs.
The International Bureau of WIPO, International Preliminary Report on Patentability for International Application No. PCT/US2014/042998, titled "Gallbladder Model" dated Dec. 30, 2015, 15 pgs.
European Patent Office, International Search Report and Written Opinion for International Application No. PCT/US2013/053497, titled "Simulated Stapling and Energy Based Ligation for Surgical Training" dated Nov. 5, 2013, 8 pgs.
The International Bureau of WIPO, International Preliminary Report on Patentability for International Application No. PCT/US2014/048027, titled "First Entry Model" dated Feb. 4, 2016, 8 pgs.
European Patent Office, International Search Report and Written Opinion for International Application No. PCT/US2015/059668, titled "Simulated Tissue Models and Methods" dated Apr. 26, 2016, 20 pgs.
Australian Patent Office, Patent Examination Report No. 1 for Australian Application No. 2012358851 titled "Advanced Surgical Simulation" dated May 26, 2016, 3 pgs.
Miyazaki Enterprises, "Miya Model Pelvic Surgery Training Model and Video," www.miyazakienterprises, printed Jul. 1, 2016, 1 pg.
Society of Laparoendoscopic Surgeons, "Future Technology Session: The Edge of Innovation in Surgery, Space, and Business" http://www.laparoscopytoday.com/endourology/page/2/ , Figure 1B: http://laparoscopy.blogs.com/laparoscopy_today/images/6-1/6-1VlaovicPicB.jpg , Sep. 5-8, 2007, 10 pgs.
European Patent Office, International Search Report and Written Opinion for International Application No. PCT/US2016/032292, titled "Synthetic Tissue Structures for Electrosurgical Training and Simulation," dated Jul. 14, 2016, 11 pgs.
European Patent Office, International Search Report and Written Opinion for International Application No. PCT/US2016/018697, titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, titled "Hysterectomy Model", dated Aug. 19, 2016, 15 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf, printed Aug. 23, 2016, pp. 1-6.
3D-MED Corporation, "Loops and Wire #1" https://www.3-dmed.com/product/loops-and-wire-1, printed August 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
European Patent Office, International Search Report for International Application No. PCT/US2011/053859 A3, dated May 4, 2012, entitled "Portable Laparoscopic Trainer".
European Patent Office, The International Search Report and Written Opinion for International Application No. PCT/US2012/60997, dated Mar. 7, 2013, entitled "Simulated Tissue Structure for Surgical Training".
European Patent Office, The International Search Report and Written Opinion for International Application No. PCT/US2012/070971, dated Mar. 18, 2013, entitled "Advanced Surgical Simulation".
Human Patient Simulator, Medical Education Technologies, Inc., http://www.meti.com (1999) all.
The International Bureau of WIPO, International Preliminary Report on Patentability for International Application No. PCT/US2011/053859, titled "Portable Laparoscopic Trainer" dated Apr. 2, 2013.
European Patent Office, The International Search Report and Written Opinion for International Application No. PCT/US2013/062363, dated Jan. 22, 2014, entitled "Surgical Training Model for Laparoscopic Procedures".
European Patent Office, The International Search Report and Written Opinion for International Application No. PCT/US2013/061949, dated Feb. 17, 2014, entitled "Surgical Training Model for Laparoscopic Procedures".
Anonymous: Realsim Systems—LTS2000, Sep. 4, 2005, pp. 1-2, XP055096193, Retrieved from the Internet: URL:https://web.archive.org/web/20050904033030/http://www.realsimsystems.com/exersizes.htm (retrieved on Jan. 14, 2014).
European Patent Office, The International Search Report and Written Opinion for International Application No. PCT/US2013/062269, dated Feb. 17, 2014, entitled "Surgical Training Model for Transluminal Procedures".
European Patent Office, The International Search Report and Written Opinion for International Application No. PCT/US2013/061557, dated Feb. 10, 2014, entitled "Surgical Training Model for Laparoscopic Procedures".

(56) References Cited

OTHER PUBLICATIONS

European Patent Office, The International Search Report and Written Opinion for International Application No. PCT/US2013/061728 dated Oct. 18, 2013, entitled "Surgical Training Model for Laparoscopic Procedures".
European Patent Office, The International Search Report and Written Opinion for International Application No. PCT/US2012/070971, dated Jul. 4, 2014, entitled "Advanced Surgical Simulation Constructions and Methods".
The International Bureau of WIPO, International Preliminary Report on Patentability for International Application No. PCT/US2012/070971, titled "Advanced Surgical Simulation" dated Jun. 24, 2014.
The International Bureau of WIPO, International Preliminary Report on Patentability for International Application No. PCT/US2012/060997, titled "Simulated Tissue Structure For Surgical Training" dated Apr. 22, 2014.
European Patent Office, Invitation to Pay Additional Fees and Where Applicable, Protest Fee, for International Application No. PCT/US2014/038195, titled "Hernia Model", dated Aug. 4, 2014.
Kurashima, Y et al., A tool for training and evaluation of laparoscopic inguinal hernia repair: The Global Operative Assessment of Laparoscopic Skills—Groin Hernia, American Journal of Surgery, Paul Hoeber, New York, NY, US vol. 201, No. 1 Jan. 1, 2011, pp. 54-61.
European Patent Office, The International Search Report and Written Opinion of the International Searching Authority for International Application No. PCT/US2014/038195 titled "Hernia Model", dated Oct. 15, 2014.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018036, entitled "Laparoscopic Training System," dated Jun. 8, 2018, 13 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.

* cited by examiner

HERNIA MODEL

CROSS-REFERENCE TO RELATED APPLICATIONS

This application is a continuation of U.S. patent application Ser. No. 14/278,929 entitled "Hernia model" filed on May 15, 2014 which claims priority to and benefit of U.S. Provisional Patent Application Ser. No. 61/823,834 entitled "Hernia model" filed on May 15, 2013 and U.S. Provisional Patent Application Ser. No. 61/973,999 entitled "Hernia model" filed on Apr. 2, 2014, all of which are incorporated herein by reference in their entirety.

FIELD OF THE INVENTION

This application relates to surgical training tools, and in particular, to simulated tissue structures and models for teaching and practicing the repair of a hernia.

BACKGROUND OF THE INVENTION

A hernia is the protrusion of an organ or the fascia of an organ through the abdominal wall. This occurs when the abdominal walls weaken either from incorrect formation at birth, recent surgery or trauma. The most common types of hernias are inguinal and incisional. Inguinal hernias occur in the groin area in both males and females but they are most common in men to the right and left of the midline where the spermatic cords and arteries pass through the spaces in the abdominal wall. There are three possible spaces in the abdominal wall for the hernia to pass through: direct, indirect and femoral. The direct space is medial to the epigastric vessels while the indirect space is lateral to the epigastric vessels. A femoral hernia occurs when the organs protrude through a large femoral ring into the femoral canal. Incisional hernias occur after a surgery when the abdominal wall does not heal correctly, causing the internal organs and fascia to push through.

Hernias can be repaired by either open or laparoscopic surgery. In laparoscopic surgery, a trocar is inserted to access a body cavity and to create a channel for the insertion of a camera, such as a laparoscope. The camera provides a live video feed capturing images that are then displayed to the surgeon on one or more monitors. Another trocar is inserted to create a pathway through which surgical instruments can be passed for performing procedures observed on the monitor. The targeted tissue location such as the abdomen is typically enlarged by delivering carbon dioxide gas to insufflate the body cavity and create a working space large enough to accommodate the scope and instruments used by the surgeon. The insufflation pressure in the tissue cavity is maintained by using specialized trocars. Laparoscopic repair has many advantages over the traditional open surgery repair including quicker recovery and less pain. Therefore, it is often more desirable for the patient to undergo a laparoscopic repair. However, laparoscopic repair requires an experienced surgeon. In order for surgeons to practice laparoscopic hernia repairs, a realistic, anatomically correct model for use in a laparoscopic training device is needed.

Generally, there are two ways to repair an inguinal hernia laparoscopically. The first and more often taught way is called transabdominal pre-peritoneal (TAPP). The TAPP approach involves placing the laparoscopic instruments all the way into the insufflated abdominal cavity and approaching the hernia from below by cutting a hole in the peritoneum. The hernia is then resected, mesh is placed over the weakened abdominal wall and the peritoneum is closed. The second way of reducing an inguinal hernia is called total extraperitoneal (TEP). The TEP approach is more difficult since it involves entering the space between the peritoneum and the abdominal wall without puncturing the peritoneum. Once the trocar has been inserted into that space, a balloon is used to open up the space to allow for easier movement of the instruments and less blunt dissection. When the balloon is removed, the space is insufflated and the hernia is found in that same plane. When the hernia is found, it is resected back into the abdominal cavity, the peritoneum laid flat and mesh placed over the weakened abdominal wall. When surgeons are learning how to perform laparoscopic surgery, they are taught TAPP first since like most other laparoscopic procedures, it is performed inside the abdominal cavity. TEP is considered more advanced and surgeons need a way to safely learn and practice the procedure. Due to the need for a safe practice model for both beginner surgeons learning TAPP as well as more advanced surgeons learning TEP, a hernia model that allows for both procedures to be practiced is needed.

In order to help patient outcomes and recoveries, surgeons need a way to practice laparoscopic hernia repairs outside of the operating room. The practice model needs to be anatomically correct and include all important landmarks normally seen during surgery in order to give the surgeon or resident the most realistic practice possible. Additionally, the model should allow the surgeon to practice incisional and inguinal (TAPP and TEP) procedures.

SUMMARY OF THE INVENTION

According to one aspect of the invention, an anatomical model for surgical training is provided. The model includes a simulated abdominal wall located at a first end of the model. The simulated abdominal wall has an inner surface and an outer surface. The simulated abdominal wall includes at least one opening extending between the inner surface and the outer surface defining a hernia opening. The model includes a simulated peritoneum located at a second end of the model. The simulated peritoneum has an inner surface and an outer surface. The simulated peritoneum is connected and adjacent to the simulated abdominal wall such that the simulated abdominal wall and the simulated peritoneum are substantially coplanar when in an open configuration and the inner surface of the simulated abdominal wall and the inner surface of the peritoneum together define a common inner surface and an overall flexible model. The model further includes a first layer of synthetic tissue. The first layer of synthetic tissue has a bottom surface and a top surface. The first layer of synthetic tissue overlays at least a portion of the simulated abdominal wall. At least part of the first layer is selectively adhered to the simulated abdominal wall and, in another variation, at least part of the first layer is adhered to the simulated abdominal wall and to the simulated peritoneum. The model further includes a plurality of simulated tissue components positioned between the first layer and the simulated abdominal wall. At least some of the simulated tissue components are adhered, at least in part, to at least one of the first layer, the simulated peritoneum, and the simulated abdominal wall. The model has a curved configuration. When in the curved configuration, part of the simulated abdominal wall is located above the simulated peritoneum and a cavity is defined between the simulated abdominal wall and the simulated peritoneum with the first end and the second end defining, in part, an opening into the cavity. In one variation, the model includes a spring layer that extends through the simulated abdominal wall and the simulated peritoneum.

According to another aspect of the invention, an anatomical model for surgical training is provided. The model includes a simulated abdominal wall located at a first end of the model. The simulated abdominal wall has an inner surface and an outer surface. The simulated abdominal wall has at least one opening extending between the inner surface and the outer surface. The model includes at least a portion of a simulated pelvis that is located at a second end of the model. The simulated pelvis has an inner surface and an outer surface. The simulated pelvis is connected and adjacent to the simulated abdominal wall such that the inner surface of the simulated abdominal wall and the inner surface of the simulated pelvis define a common inner surface of the model. The model further includes a first layer of synthetic tissue having a bottom surface and a top surface. The first layer of synthetic tissue overlays at least a portion of the simulated pelvis and at least a portion of the simulated abdominal wall. The first layer of synthetic tissue is adhered to at least a portion of the simulated pelvis and to at least a portion of the simulated abdominal wall. The first layer includes at least one opening aligned with the at least one opening in the simulated abdominal wall. The model includes a second layer of synthetic tissue having a bottom surface and a top surface. The second layer of synthetic tissue overlays at least a portion of the top surface of the first layer. The second layer includes at least one opening aligned with the at least one opening in the simulated abdominal wall. The model further includes a plurality of simulated tissue components positioned between the first layer of synthetic tissue and the second layer of synthetic tissue. At least some of the plurality of simulated tissue components is adhered, at least in part, to at least one of the first layer of synthetic tissue and the second layer of synthetic tissue. The model further includes a synthetic peritoneum overlaying at least one of the simulated abdominal wall and the simulated pelvis and is located above the second layer of synthetic tissue. At least a portion of the synthetic peritoneum is removably pushed into one of the openings in the simulated abdominal wall to simulate a hernia.

According to another aspect of the invention, a surgical simulation system for practicing hernia repair is provided. The surgical simulation system includes a hernia model placed inside a surgical training device. The hernia model includes a simulated abdominal wall located at a first end of the model. The simulated abdominal wall has an inner surface and an outer surface. The simulated abdominal wall has at least one opening extending between the inner surface and the outer surface. The hernia model includes at least a portion of a simulated pelvis located at a second end of the hernia model. The simulated pelvis has an inner surface and an outer surface. The simulated pelvis is connected to the simulated abdominal wall such that the inner surface of the simulated abdominal wall and the inner surface of the simulated pelvis define a common inner surface of the model. The hernia model includes a first layer of synthetic tissue having a bottom surface and a top surface. The first layer of synthetic tissue overlays at least a portion of the simulated pelvis and at least a portion of the simulated abdominal wall. The first layer is adhered to at least a portion of the simulated pelvis and to at least a portion of the simulated abdominal wall. The first layer includes at least one opening aligned with the at least one opening in the simulated abdominal wall. The model further includes a second layer of synthetic tissue having a bottom surface and a top surface. The second layer overlays at least a portion of the top surface of the first layer. The second layer includes at least one opening aligned with the at least one opening in the simulated abdominal wall and the at least one opening in the first layer. The hernia model also includes a plurality of simulated tissue components positioned between the first layer of synthetic tissue and the second layer of synthetic tissue. At least some of the plurality of simulated tissue components are adhered, at least in part, to at least one of the first layer of synthetic tissue and the second layer of synthetic tissue. The model further includes a synthetic peritoneum overlaying at least a portion of the simulated abdominal wall and at least a portion of the simulated pelvis. The synthetic peritoneum is positioned above the second layer of synthetic tissue. The surgical training device includes a base and a top cover connected to and spaced apart from the base to define an internal cavity. The internal cavity is at least partially obstructed from direct observation by a user and is configured for practicing laparoscopic surgical techniques. The top cover includes an aperture or penetrable simulated tissue region for the passage of surgical instruments into the internal cavity. The hernia model is positioned inside the internal cavity.

According to another aspect of the invention, a model that allows surgeons and residents to practice incisional and inguinal hernia repairs is provided. The model is a clam-shaped and simulates the insufflated space between the abdominal muscles and peritoneum. A hole is provided in the model from which a simulated peritoneum and/or simulated bowel protrudes to create a simulated hernia. The model contains all important anatomical structures including Cooper's ligament, the iliopubic tract, the pubic ramus bone, the medial umbilical ligament, the triangle of doom, triangle of pain and the spermatic cords. The model is covered with a layer of simulated tissue to allow users to practice dissecting in order to find and navigate the important anatomical landmarks and to safely repair the hernia. Additionally, the model is designed with a thick abdominal wall to allow the surgeon to practice tacking mesh to repair the hernia. Silicone is used to create the thick abdominal walls, simulated anatomical structures and synthetic tissue. A spring layer may be incorporated to provide realistic resiliency to the model while maintaining a simulated insufflated space configuration or curved configuration. The model may be used to selectively simulate direct, indirect and femoral inguinal hernia repairs as well as incisional hernia repairs by removably placing the protruding simulated tissue into any one of three openings in the model. The model sits on a base or frame that imparts and maintains the clam shape or is connected to a rigid simulated pelvis. When located inside a laparoscopic trainer with an angled top cover to simulate a Trendelenburg position of the patient, the model provides an ideal simulation for teaching and practicing laparoscopic hernia repair.

DETAILED DESCRIPTION OF THE INVENTION

Figure 1:
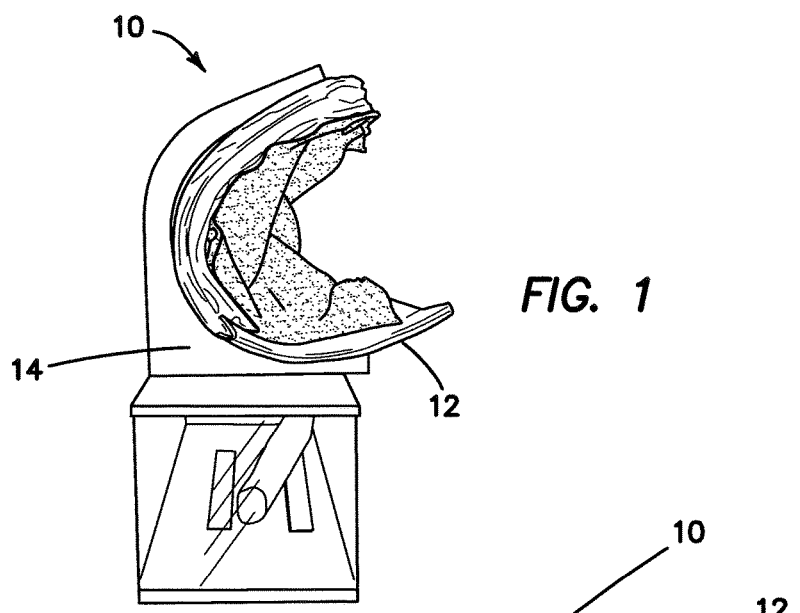
FIG. 1 is a side perspective view of a hernia model according to the present invention.
Figure 2:
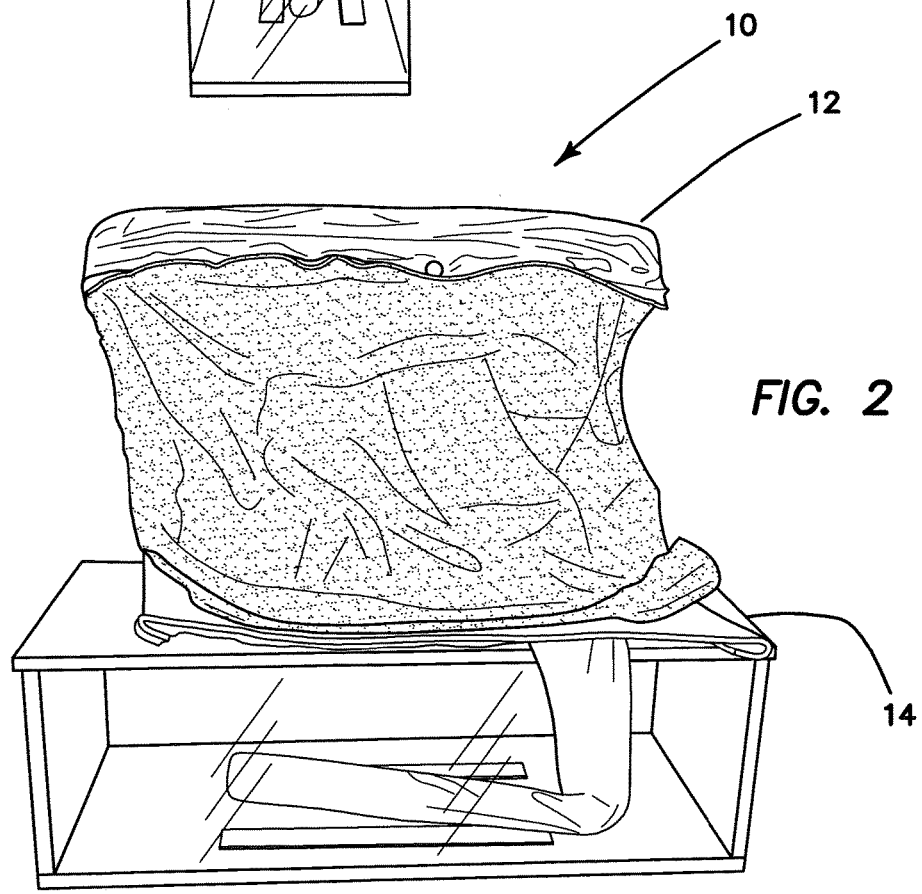
FIG. 2 is a front perspective view of a hernia model according to the present invention.
Figure 3:
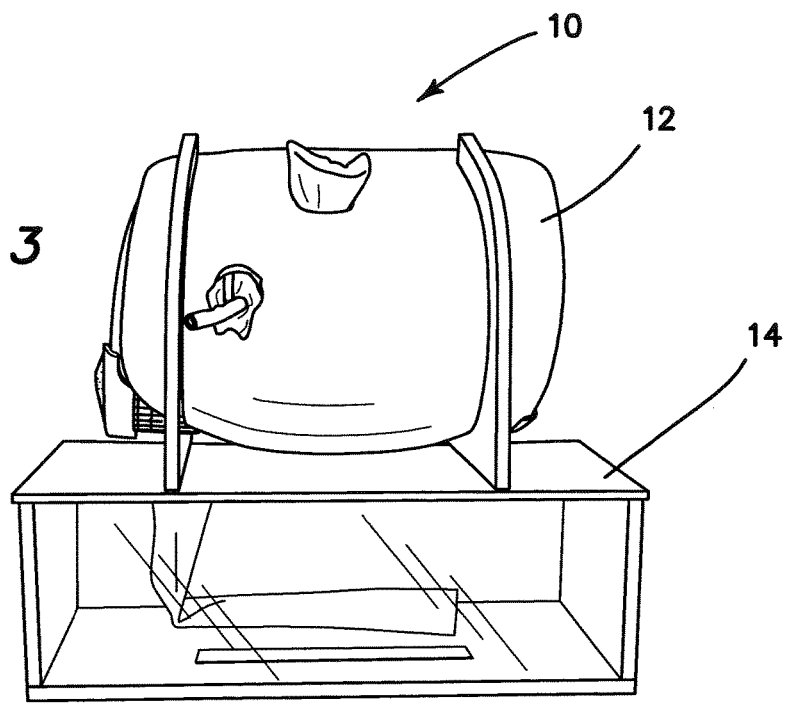
FIG. 3 is rear perspective view of a hernia model according to the present invention.

Referring to FIGS. 1-3, there is shown a side, front and rear view, respectively, of a hernia model 10 according to the present invention. The hernia model 10 includes an anatomical portion 12 supported by a frame 14. As seen most clearly in FIG. 1, the substantially planar anatomical portion 12 is maintained in a curved configuration such that the major part of the anatomical portion 12 is substantially C-shaped forming a half or open generally cylindrical configuration. The concavity formed inside the C-shaped disposition of the anatomical portion 12 advantageously simulates an insufflated space between an artificial muscular abdominal wall generally located at the top of the C shape and the simulated peritoneum 18 generally located at the bottom of the C shape. The simulated muscular abdominal wall forms approximately the top half or more than the top half of the C-shaped curve; whereas, the bottom half or less than the bottom half of the C-shaped curve is formed by the simulated peritoneum 18. The open clamshell-like configuration advantageously provides a realistic surgical approach to repairing a hernia when viewed by the user from the front of the hernia model 10 as in FIG. 2.

The frame or stand 14 divides the hernia model 10 into an upper portion and a lower portion. The lower portion constitutes approximately one-third of the entire height of the hernia model 10 and simulates the abdominal cavity beneath the peritoneum. The lower portion contains that part of the anatomical portion 12 such as the simulated bowel that protrudes through the simulated peritoneum 18 and through the simulated muscular abdominal wall. The upper portion contains the anatomical portion 12. FIGS. 1-3 illustrate a simulated bowel residing in the lower portion and extending upwardly through an opening in the peritoneum 18 into the concavity of the upper portion. The simulated bowel crosses the concavity of the insufflated space and exits through an opening in the muscular abdominal wall to simulate a hernia. One or more exit openings in the simulated muscular abdominal wall of the anatomical portion 12 is provided to simulate the possible spaces in the abdominal wall for the hernia to pass through. Generally, there are three spaces through which a hernia may pass. These spaces are the direct space, the indirect space and the femoral space. If all three openings are provided in the hernia model, the distal end of simulated bowel is inserted into any one of the exit openings for practicing hernia repair through any of the three spaces. The surgeon practices approaching the simulated insufflated space of the hernia model 10 from the front, either from below the peritoneum or above the peritoneum for practicing TAPP or TEP, respectively. The surgeon visualizes the insufflated space, practices carefully dissecting simulated fascia layers, identifying a variety of visual anatomical markers, navigating around them to approach the bowel, resecting the hernia and placing mesh to patch and close any spaces.

Figure 4:
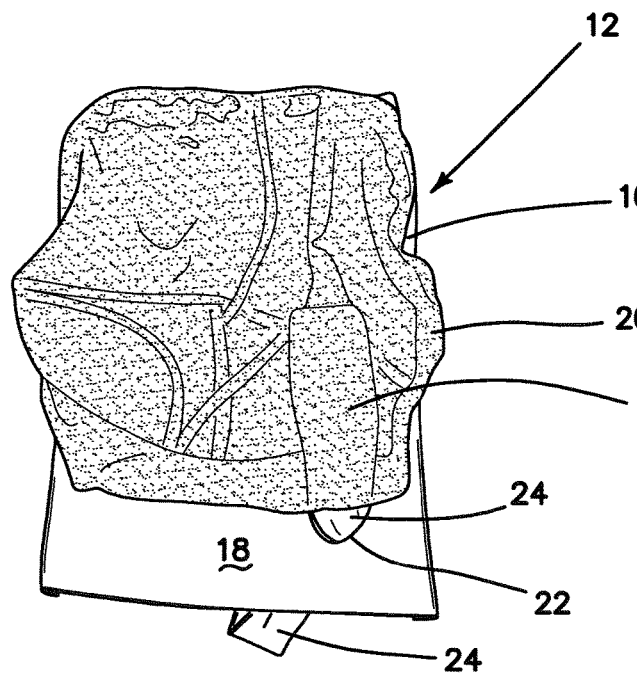
FIG. 4 is a top view of an anatomical portion of a hernia model according to the present invention.

The anatomical portion 12 of the hernia model 10 will now be described in detail with reference to FIGS. 4-8. Turning to FIG. 4, there is shown a top view of an anatomical portion 12 of the hernia model 10. The anatomical portion 12 is a substantially planar object having varying thickness and materials. The anatomical portion 12 includes a simulated muscular abdominal wall portion 16 interconnected in substantially the same plane to a simulated peritoneum portion 18. Aside from the relatively thicker abdominal wall portion 16 relative to the peritoneum portion 18, both the abdominal wall portion 16 and peritoneum portion 18 are substantially coplanar. In human anatomy, the layers of the abdominal wall are from superficial to deep: 1) skin, 2) fascia, 3) muscle, which includes the rectus abdominis, external oblique muscle, internal oblique muscle and transverse abdominal muscle, 4) fascia transversalis, and 5) peritoneum. These abdominal layers are sandwiched or layered above each other to form part of the abdominal wall portion 16. In the present invention, one or more layers representing muscle are positioned substantially coplanar with or otherwise adjacent to the simulated peritoneum portion. In this arrangement, the top side (anterior facing surface) of the simulated peritoneum 18 is substantially coplanar or adjacent to the bottom side (posterior facing surface) of the simulated muscular abdominal wall portion 16 such that when the substantially planar anatomical portion 12 is curved into a C-shape configuration the bottom side of the simulated muscular abdominal wall portion 16 faces and is spaced apart from the top side of the simulated peritoneum 18. The interior portion of the C-shaped structure simulates an insufflated space. In real surgery, the insufflated space is created by inserting a trocar between the muscle layer and peritoneum and delivering fluid such as carbon dioxide gas under pressure from the proximal end of the trocar to the distal end of the trocar to spread apart the muscle layer from the peritoneum to create a working space. The simulated insufflation cavity of the present invention is the concavity of the C-shaped orientation which is approximately 5 inches in height and approximately 10 inches in length. As can be seen in FIG. 4, the simulated muscular abdominal wall portion 16 is approximately 8 inches long and approximately 7.5 inches wide and is adjacent to the simulated peritoneum 18 which is approximately 3 inches long and approximately 7.5 inches wide. When formed into a clamshell configuration, the simulated muscular abdominal wall portion 16 is disposed at the top of the hernia model 10 and follows the C-shaped curve down beyond the halfway mark of the C-shape. The simulated peritoneum 18 is disposed at the bottom of the C-shape and curves upwardly approximately a third of the way along the C-shape when the anatomical portion 12 is formed into a clamshell. Overall, the substantially planar anatomical portion 12 is approximately 7.4 inches wide and approximately 11 inches long. The anatomical portion 12 further includes a simulated fascia layer 20 located on the inner surface of the anatomical portion 12. The simulated fascia layer 20 is a thin layer that is partially translucent and draped over the simulated muscular abdominal wall 16. The simulated fascia layer 20 is glued with adhesive in one or more locations and generally does not extend to completely over the simulated peritoneum 18 when laid flat as shown in FIG. 4. The simulated peritoneum 18 includes an opening 22 simulating the location of a ruptured peritoneum through which a simulated bowel 24 protrudes above the inner or top surface of the peritoneum 18. The simulated bowel 24 is part of the anatomical portion 12 although it is loosely connected thereto such that the simulated bowel 24 may be moved, pulled and pushed through the opening 22 and other spaces.

Figure 5:
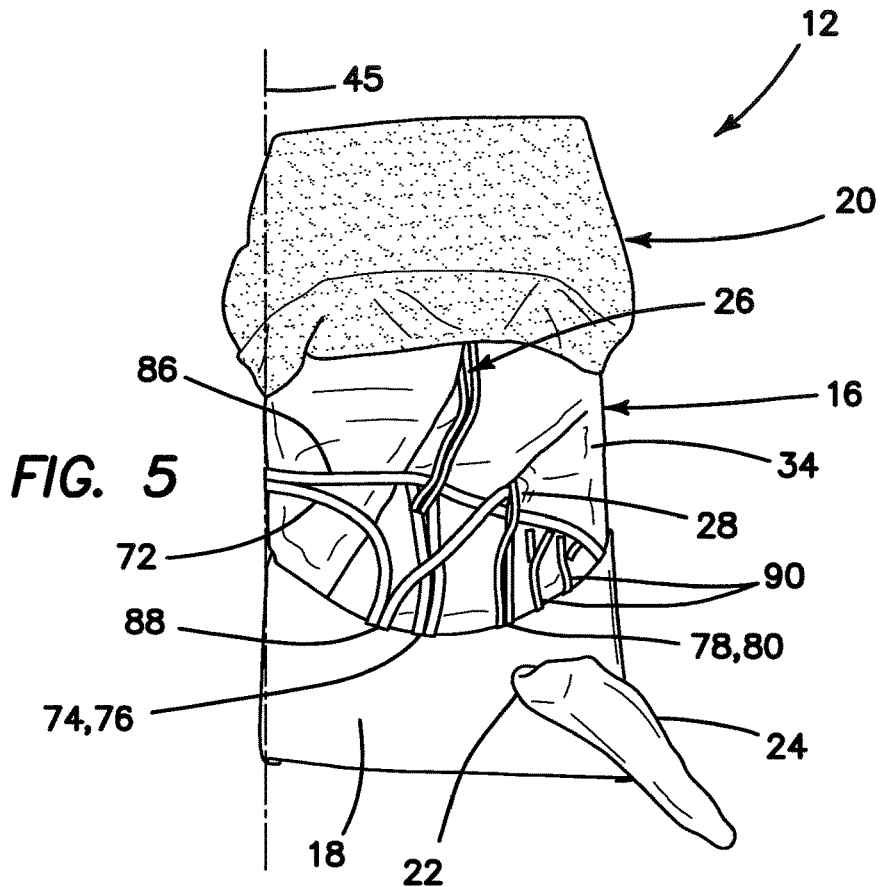
FIG. 5 is a top view of an anatomical portion of a hernia model according to the present invention.
Figure 6:
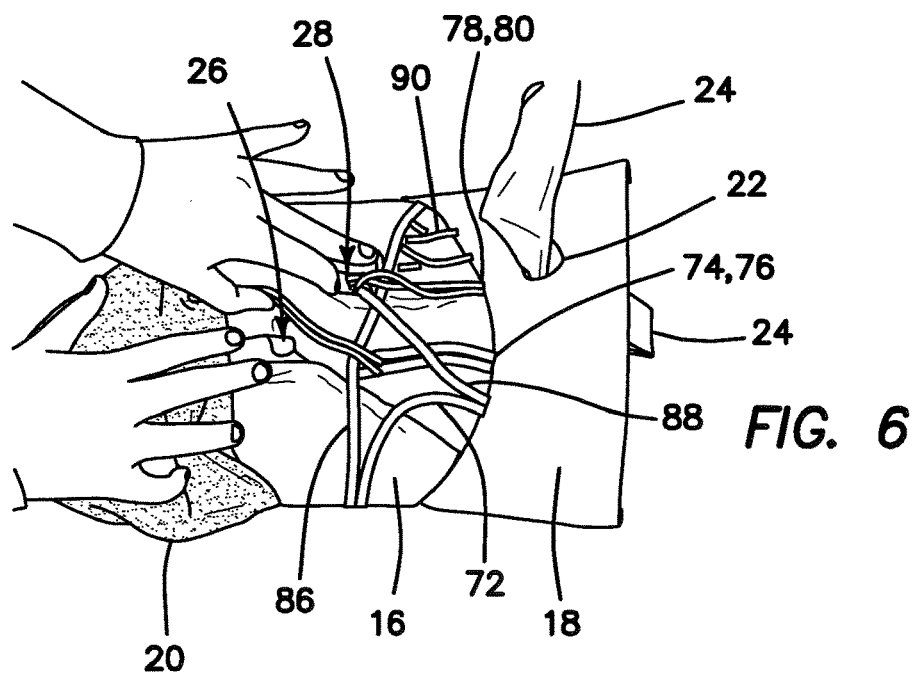
FIG. 6 is a top view of an anatomical portion of a hernia model with human hands shown retracting simulated tissue according to the present invention.

Turning to FIG. 5, there is shown a top view of the anatomical portion 12 with the simulated fascia layer 20 uncovering the underlying simulated muscular abdominal wall 16. Various anatomical structures are provided on the surface of the simulated muscular abdominal wall 16. These landmarks include but are not limited to Cooper's ligament 72, vas deferens 88, external iliac vessels 74, 76, spermatic vessels 78, 80, nerves 90, and iliopubic tract 86 arranged as labeled in FIG. 5. A piece of hard plastic (not shown) may also be embedded to simulate a femoral bone. In addition to opening 22 in the simulated peritoneum 18, one or more additional openings are formed through the simulated muscular abdominal wall 16. These additional openings define exit openings or spaces through which the bowel protrudes in a hernia. In FIG. 5, a first opening 26 and a second opening 28 are formed through the simulated muscular abdominal wall 16 to simulate the direct space and indirect space, respectively. FIG. 6 illustrates the first and second openings 26, 28 more clearly. Also visible in both FIGS. 5 and 6 is the curved intersection between the simulated muscular abdominal wall 16 and the simulated peritoneum 18. The simulated bowel 24 is passed through the opening 22 in the simulated peritoneum 18 such that the distal end resides above the inner surface and at least a portion of the simulated bowel 24 is above the top surface of the peritoneum 18. The distal end of the simulated bowel 24 is then passed into either of the first opening 26 or second opening 28 to simulate a hernia located in the direct or indirect space, respectively. In FIG. 4, the simulated bowel 24 is shown passed into the second opening 28 representing the indirect space. The hernia model 10 simulates a portion of the anatomy lateral to the midline 45 of a patient.

Figure 7:
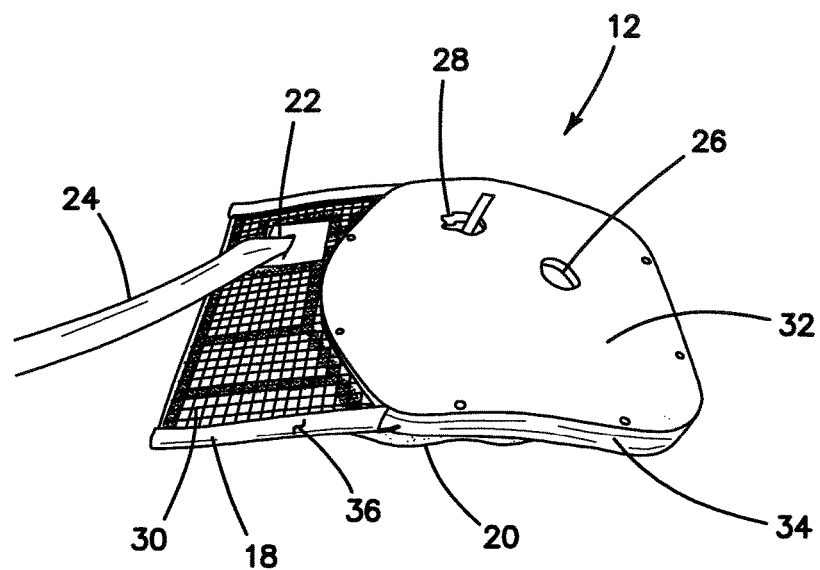
FIG. 7 is a bottom perspective view of an anatomical portion of a hernia model according to the present invention.
Figure 8:
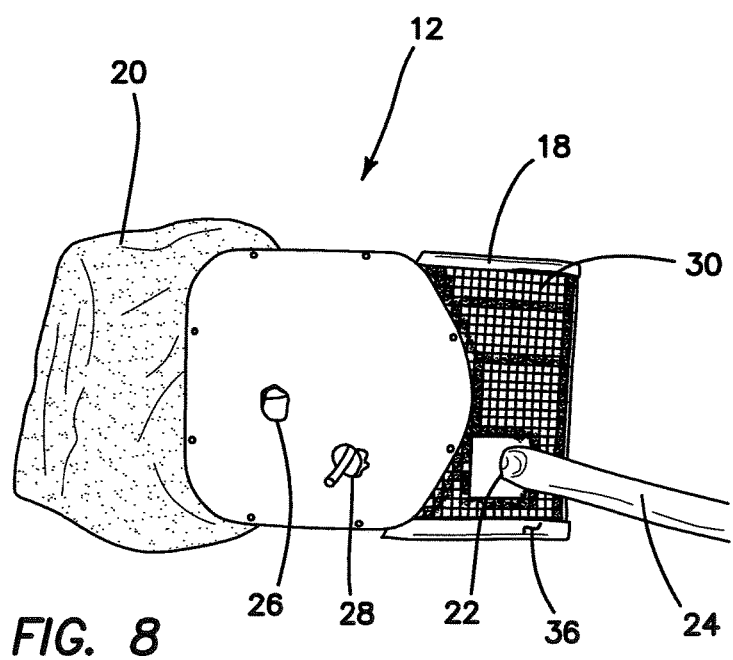
FIG. 8 is bottom view of an anatomical portion of a hernia model according to the present invention.

Turning now to FIGS. 7 and 8, there is shown a perspective and bottom view of the outer surface of the anatomical portion 12. The anatomical portion 12 is built upon a layer of flexible wire mesh 30 such as chicken wire. The wire mesh material 30 is made of thin, flexible galvanized steel wire crisscrossing to form small square or other-shaped windows. The outer surface of the wire mesh layer 30 is covered with a first layer of silicone 32 which is glued to the wire mesh layer 30. The inner surface of the wire mesh layer 30 is covered with a second layer of silicone 34 sandwiching the wire mesh layer 30 between the first and second layers of silicone 32, 34 forming the simulated muscular abdominal wall 16 at one end of the anatomical portion 12. At the other end of the anatomical portion 12, the inner surface of the wire mesh 30 is covered with a yellow foam layer 36 forming the simulated peritoneum 18. The yellow foam layer 36 that is approximately 1/16 of an inch thick is adhered to inner surface of the mesh layer with adhesive with the outer edges of the yellow foam layer 36 being wrapped over the outer edges of the mesh layer 30. The yellow foam layer 36 forms the finished inner surface of one end of the anatomical portion 12. The simulated muscular abdominal wall 16 comprising the first and second silicone layers 32, 34 and wire mesh layer 30 is approximately 0.75 inches thick. The same wire mesh layer or frame 30 extends throughout the anatomical portion 12 defining the general plane of the anatomical portion 12. The simulated peritoneum 18 is substantially thinner than the simulated muscular abdominal wall 16 although still generally coplanar and adjacent to the simulated abdominal wall 16. The thick simulated muscular abdominal wall 16 permits the surgeon to tack surgical mesh to the abdominal wall to practice patching the hernia.

With reference back to FIGS. 5-6, the inner surface of the second silicone layer 34 is populated with a variety of anatomical landmarks as mentioned above. The second silicone layer 34 is textured and additional silicone layers may be employed above the second layer 34 to complete the anatomical geography. The tubular simulated vessels and nerves are made of silicone and have diameters of approximately 0.185 inches. The simulated Cooper's ligament 72, iliopubic tract 86 and vas deferens 88 are also made of silicone and have diameters of approximately 0.25 inches. The thick external iliac vessels 74, 76 are made of silicone and have a diameter of approximately 0.25-0.375 inches. These tubular structures are made by pouring uncured silicone into straw like tubes and removed them after they solidify. The simulated bowel 24 is made from a thin layer of pink-colored silicone. The silicone comprising the iliopubic tract 86, Cooper's ligament 72 and vas deferens 88 is colored white, the nerves are colored yellow, the external iliac vein 74 and spermatic vein 78 are blue, the external iliac artery 76 and the spermatic artery 80 are red and the remaining vessels are red or pink.

Figure 9:
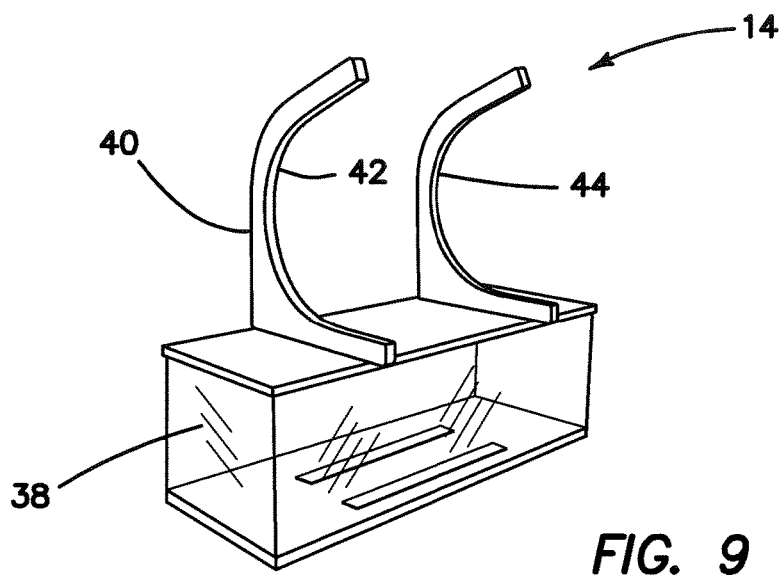
FIG. 9 is a top perspective view of a frame of a hernia model according to the present invention.

Turning now to FIG. 9, there is shown a perspective view of a frame 14 configured to hold the anatomical portion 12 of the hernia model 10 according to the present invention. The frame 14 includes a rectangular lower frame portion 38 and an upper frame receiving portion 40. The lower frame portion 38 is configured to house excess simulated bowel 24 that is simulated to reside below the peritoneum. The lower frame portion 38 includes a base and two or more upwardly extending side walls to form a rectangular container with a top wall. At least one opening is provided, for example via an open side, into the lower frame portion 38. The upper frame portion 40 is configured to receive the anatomical portion 12 and retain the anatomical portion 12 in a clamshell or C-shaped orientation. As such, the upper frame portion 40 includes a C-shaped receiving portion to receive and retain the anatomical portion in a C-shaped configuration. In FIG. 9, the C-shaped receiving portion is formed by two upwardly extending C-shaped claws or prongs 42, 44 that are attached to a top wall of the lower frame portion 38. Any number of C-shaped prongs 42, 44 including a wide singular prong may be employed to retain the anatomical portion 12. The lower frame portion 14 is approximately 10.5 inches wide, approximately 4 inches deep and 3.5 inches tall. The C-shaped prongs 42, 44 are approximately 6 inches in height and each have a concavity that is approximately 4 inches deep.

As described above, the anatomical portion 12 is substantially planar and made of flexible silicone, flexible foam and flexible wire mesh. The wire mesh layer 30 advantageously imparts the anatomical portion 12 with a resiliency that permits the planar anatomical portion 12 to be bent into a substantially semi-cylindrical or C-shaped configuration and placed into the C-shaped receiving prong(s) of the frame 14. The mesh layer 30 acts as a spring layer such that when the anatomical portion 12 is bent and inserted into the frame 14, it exhibits a biasing force against the frame 14 advantageously keeping the anatomical portion 12 in position. Removability of the anatomical portion 12 allows for interchangeability of the anatomical portion 12 after it has been used several times for replacement, repair, reconstruction and compact transport. When the anatomical portion 12 is removed from the frame 14, the resilient mesh layer 30 aids in springing the anatomical portion 12 back to its substantially planar orientation. Hence, the mesh spring layer advantageously keeps the silicone and foam layers 32, 34 and 36 from collapsing onto itself while in the clam shape.

Although the hernia model 10 is described above to be comprised of an anatomical portion 12 that is separate from the frame 14, one skilled in the art will recognize that, in an alternative variation, the hernia model 10 can be constructed such that the frame 14 and anatomical portion 12 is formed integrally as one piece. Furthermore, although the hernia model 10 of the present invention may be used to practice hernia repair in a simulated open surgical procedure, the hernia model 10 is also advantageously configured for practicing laparoscopic hernia repair, in particular, employing the TEP approach. As such, the hernia model 10 of the present invention is configured to function together with a specialized laparoscopic trainer which will now be discussed in detail.

Figure 10:
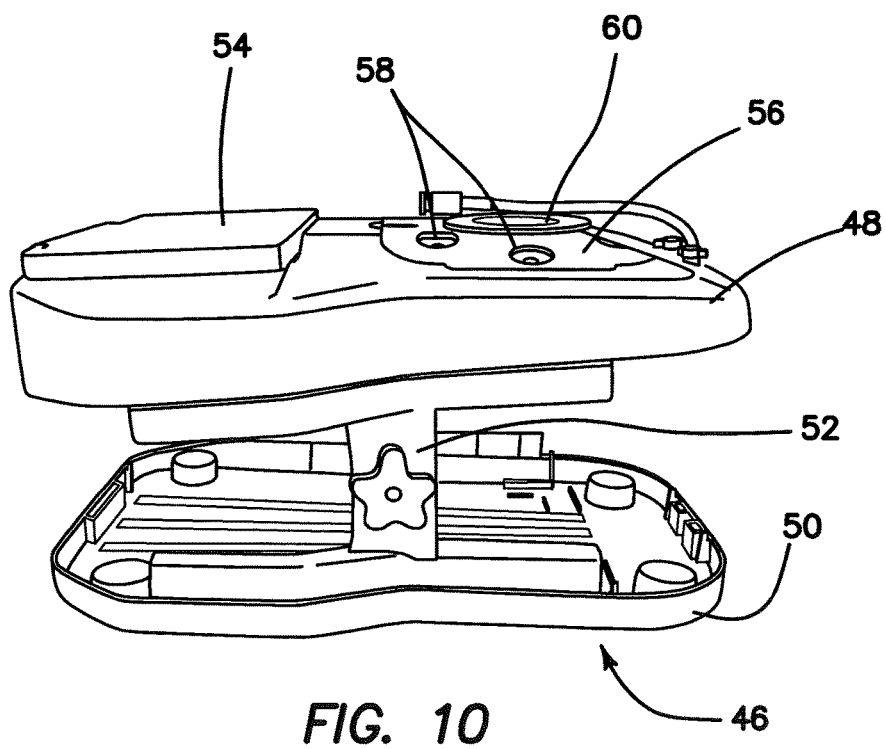
FIG. 10 is a side perspective view of a laparoscopic trainer.

Turning now to FIG. 10, there is shown a laparoscopic trainer 46. The laparoscopic trainer 46 is described in co-pending U.S. patent application Ser. No. 13/248,449 entitled "Portable laparoscopic trainer" and filed on Sep. 29, 2011 by Pravong et al. to Applied Medical Resources Corporation and published as U.S. Patent Publication No. 2012/0082970, hereby incorporated by reference in its entirety herein. The laparoscopic trainer 46 includes a top cover 48 connected to a base 50 by a pair of legs 52 spacing the top cover 48 from the base 50. The laparoscopic trainer 46 is configured to mimic the torso of a patient such as the abdominal region. The top cover 48 is representative of the anterior surface of the patient and the space between the top cover 48 and the base 50 is representative of an interior of the patient or body cavity where organs reside. The laparoscopic trainer 46 is a useful tool for teaching, practicing and demonstrating various surgical procedures and their related instruments in simulation of a patient. Surgical instruments are inserted into the cavity through pre-established apertures 58, 60 in the top cover 48. These pre-established apertures may include seals that simulate trocars or may include simulated tissue 60 that simulates the patient's skin and abdominal wall portions. Various tools and techniques may be used to penetrate the top cover 48 to perform mock procedures on model organs placed between the top cover 48 and the base 50 such as the hernia model 10. When placed inside the cavity of the trainer 46, the hernia model 10 is generally obscured from the perspective of the user who can then practice performing surgical techniques laparoscopically by viewing the surgical site indirectly via a video feed displayed on a video monitor.

A video display monitor 54 that is hinged to the top cover 48 is shown in a closed orientation in FIG. 10 and in an open orientation in FIGS. 11-14. The video monitor 54 is connectable to a variety of visual systems for delivering an image to the monitor 54. For example, a laparoscope inserted through one of the pre-established apertures 58, 60 or a webcam located in the cavity and used to observe the simulated procedure can be connected to the video monitor 54 and/or a mobile computing device to provide an image to the user. In another variation, the top cover 48 does not include a video display but includes means for supporting a laptop computer, a mobile digital device or tablet such as an IPAD® and connecting it by wire or wirelessly to the trainer 46.

When assembled, the top cover 48 is positioned directly above the base 50 with the legs 52 located substantially at the periphery and interconnected between the top cover 48 and base 50. The top cover 48 and base 50 are substantially the same shape and size and have substantially the same peripheral outline. Although the trainer 46 has no sidewalls, the legs 52 partially obscure the internal cavity from view from an otherwise open-sided trainer 46. The top cover 48 includes a first insert 56 removable and replaceable with respect to the top cover 48, in particular, insertable into and removable from an opening formed in the top cover 48. The first insert 56 includes a plurality of apertures 58 to serve as fixed insertion ports for a variety of instruments. The apertures 58 may include various seals. The first insert 56 also includes a tissue simulation region 60 for simulating the skin or several layers of tissue. In one embodiment, the tissue simulation region 60 is configured as a second insert provided within the first insert 56. The second insert is removable and replaceable via snap-fit, friction fit or threaded engagement or other means with respect to the top cover 48 or with respect to the first insert 56 if provided.

Figure 11:
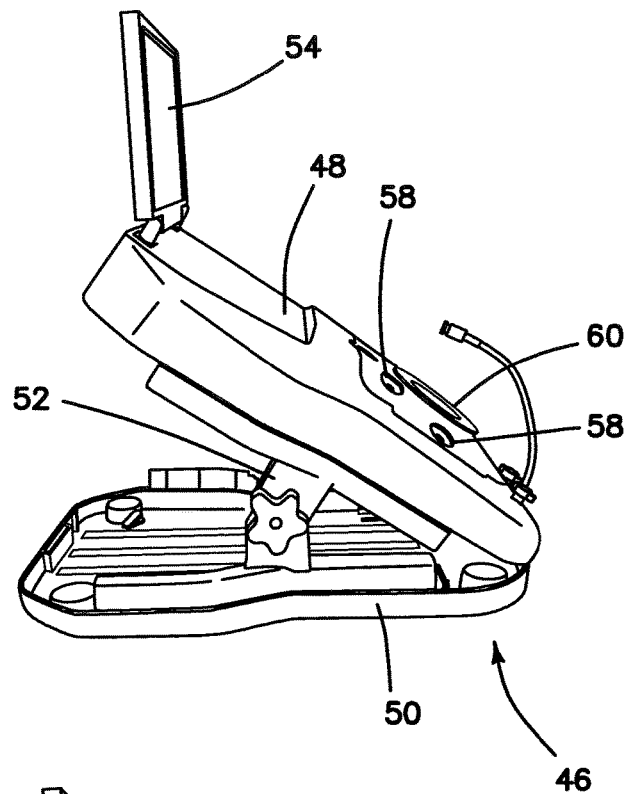
FIG. 11 is a side perspective view of a laparoscopic trainer with an angled top cover.

Turning now to FIG. 11, the laparoscopic trainer 46 includes a top cover 48 that angulates with respect to the base 50. The legs 52 are configured to permit the angle of the top cover 48 with respect to the base 50 to be adjusted. FIG. 11 illustrates the trainer 46 adjusted to an angulation of approximately 30-45 degrees with respect to the base 50 and in another variation approximately 30-35 degrees. The angulation of the trainer 46 advantageously simulates a patient in a Trendelenburg or reverse Trendelenburg position. In the Trendelenburg position the body is tilted such that it is laid flat on the back with the feet higher than the head or vice versa. The Trendelenburg position allows better access to the pelvic organs as gravity pulls the intestines away from the pelvis to thereby prevent encroachment of the intestines upon the pelvic operating field to provide more working space inside the abdominal cavity in which the surgeon can more easily manipulate organs. The selected angulation of the top cover 48 is locked by tightening thumbscrews provided on the legs 52. The angulation of the top cover 48 of the trainer 46 with respect to the base 50 is particularly advantageous with respect to accommodating the hernia model 10 of the present invention.

Figure 12:
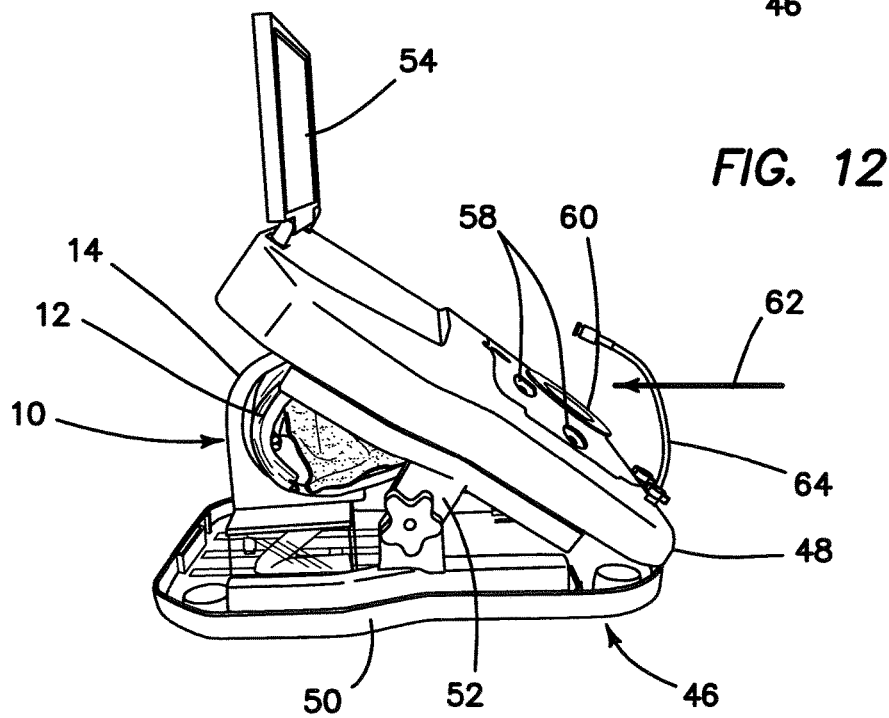
FIG. 12 is a side perspective view of a laparoscopic trainer with a hernia model according to the present invention.
Figure 13:
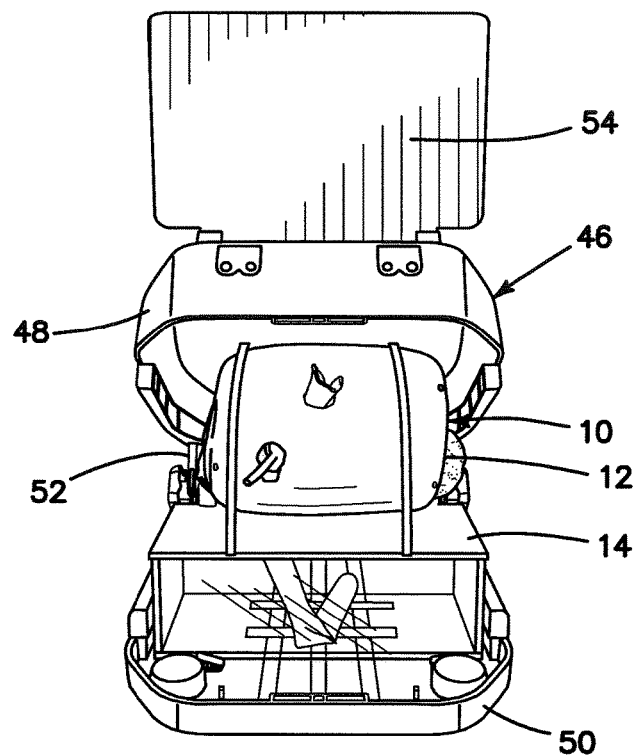
FIG. 13 is a rear perspective view of a laparoscopic trainer with a hernia model according to the present invention.

With the top cover 48 angled as shown in FIG. 11, the hernia model 10 is inserted into the cavity of the trainer 46 and positioned between the top cover 48 and base 50 as shown in FIG. 12. The rear view of the trainer 46 with the hernia model 10 inserted is shown in FIG. 13. As described above, the anatomical portion 12 of the hernia model 10 is held in a C-shaped configuration in frame 14 such that the opening to the C-shape or opening to the clamshell is oriented approximately 90 degrees from the vertical. In other words, if the anatomical portion 12 is considered to be substantially U-shaped with the opening to the U facing upwardly, when the U is turned 90 degrees on its side, a substantially C-shaped configuration is created. With the hernia model 10 inserted into the trainer 46, the opening of the C shape faces the front of the trainer 46 or, in other words, the opening or concavity of the C shape faces the top cover 48. If the top cover 48 was not angled, the concavity of the C shape would not face the top cover 48 and, instead, the opening of the C shape would face the front side between the top cover 48 and the base 50. The top cover 48 is angled such that the top cover 48 is positioned between the user and the hernia model 10 obscuring the opening of the C shape from the user. The direction of approach by the user is depicted in FIG. 12 by the arrow 62. It is substantially along this direction 62 that instruments will be inserted through the tissue simulation region 60 and apertures 58 in the top cover 48 to access the hernia model 10. In one variation, the simulated fascia layer 20 is connected to the trainer 46 with clips (not shown) that are connected to the trainer 46. The clips may be retractable and attached to the top cover 48, base 50, or legs 52. When clipped with the clips, the simulated fascia layer 20 is suspended within the cavity of the trainer 46 between the top cover 48 and the base 50 such as from the top cover 48. A gooseneck laparoscope holder 64 is provided on the trainer 46 to hold a scope (not shown). The scope is inserted into the trainer cavity via one of the apertures 58 or region 60 to capture video images of the obscured hernia model and display them to the user via the video monitor 54. Users practicing hernia repair will pass other instruments in addition to the scope into the cavity of the trainer to access the hernia model inside the trainer 46.

Figure 14:
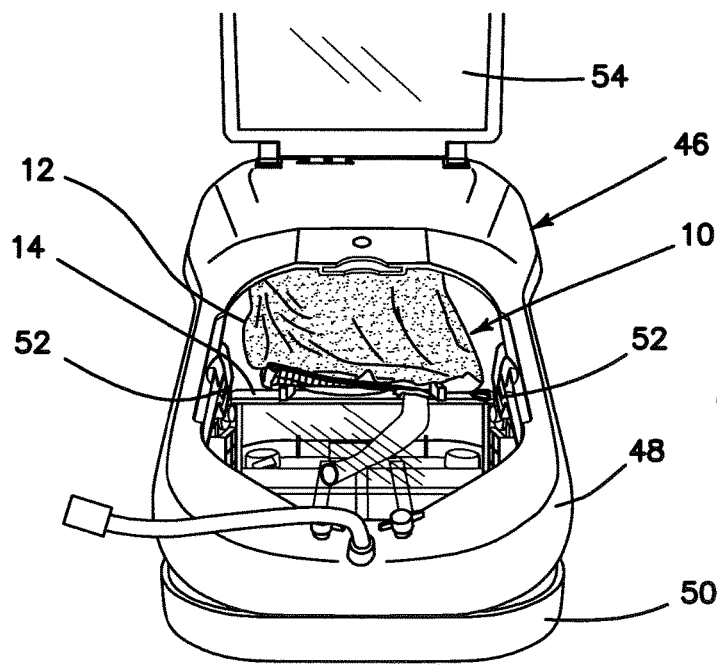
FIG. 14 is a front perspective view of a laparoscopic trainer with a hernia model according to the present invention.

FIG. 14 is a front view of the laparoscopic trainer 46 with the first insert 56 removed to provide a view of the hernia model 10 from the perspective of the user. The combination of the hernia model 10 and trainer 46 is particularly unique because it permits hernia repair training in a laparoscopic simulation. The hernia model 10 itself simulates an insufflation cavity formed between the muscular abdominal wall and the peritoneum via the C-shaped construct and without the need for any insufflation gas in the training simulation. This C-shaped construct is resiliently held in position by the reinforced metallic mesh layer 30 which provides support to the silicone tissue features attached thereto. The metallic mesh layer 30 and silicone layers 32, 34 further provide a springy feel that is realistic to an abdominal wall distended outwardly by insufflation gas. The selected colors and materials employed in the anatomical portion 12 including the yellow foam for the peritoneum and the pink silicone and translucent fascia layer and bowel mimic a real live surgical situation. Because the hernia model 10 includes an anatomical portion 12 that is angled 90 degrees, the resulting visual mimics the angles encountered in a real hernia repair situation. Furthermore, the angled top cover 48 of the trainer 46 allows the tall hernia model 10 to be received with ease. Also, the angled top cover 48 further mimics the outer anterior body of the patient with an insufflated abdominal region that is enlarged in the area of the hernia.

Figure 15:
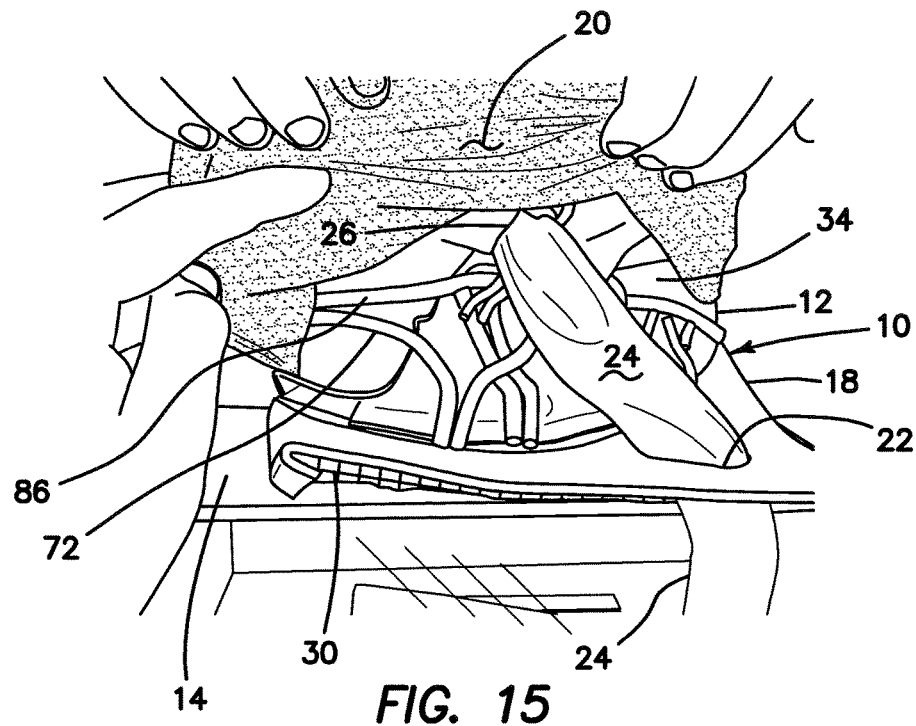
FIG. 15 is a front perspective view of a hernia model with human hands shown retracting simulated tissue according to the present invention.
Figure 16:
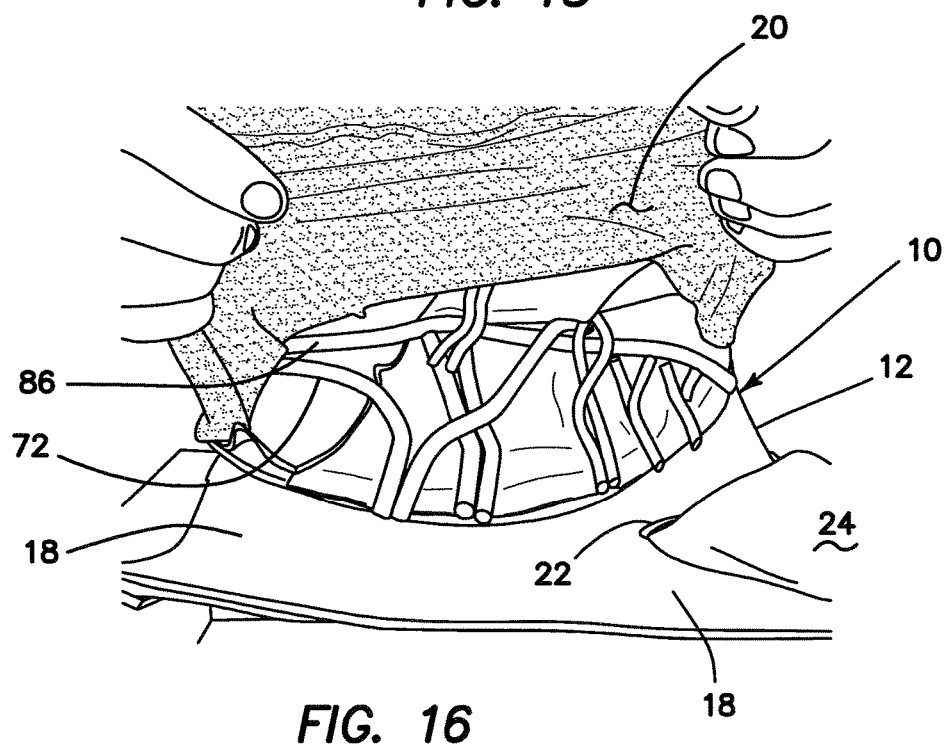
FIG. 16 is a front perspective view of a hernia model with human hands shown retracting simulated tissue according to the present invention.

The hernia model 10 combined with the angled trainer 46 provides a unique wedge-shaped approach to the target site of hernia repair via arrow 62 into a triangular or wedge-shaped cavity. This triangular shaped cavity is best seen in FIG. 12 wherein one side of the triangle, generally the hypotenuse of the triangle, is formed by the top cover 48. The base 50 of the trainer 46 forms the other side of the triangle that is substantially perpendicular to the hernia model 10 which forms the third side of the triangle. This triangle across the width of the trainer 46 defines a wedge-shaped cavity inside the trainer 46. With the angle of the top cover 48 being less than 45 degrees, an elongated wedge is created having a confined approach following arrow 62 or narrow cavity near the front of the trainer 46 that expands towards the rear of the trainer 46 where the hernia model 10 is located. This wedge-shaped cavity provides for an extremely realistic, confined and challenging surgical approach for the surgeon to practice both TEP and TAPP hernia repairs. FIG. 15 shows a view of the hernia model 10 as a surgeon practitioner would see in practice. The simulated fascia layer 20 is shown lifted by hand whereas, the surgeon practitioner would employ instruments to lift and dissect the simulated fascia layer 20. FIG. 15 illustrates a bowel portion 24 extending through the direct space 26. FIG. 16 illustrates a front view of the hernia model 10 with the simulated bowel portion 24 resected from the direct space 26 and still protruding through the opening 22 in the peritoneum 18.

Figure 17:
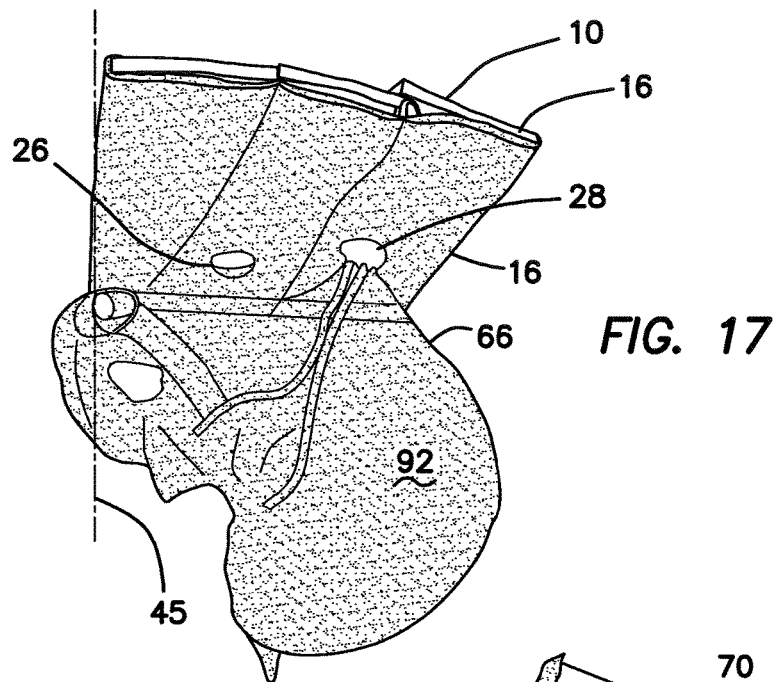
FIG. 17 is a front top perspective view of a hernia model according to the present invention.
Figure 18:
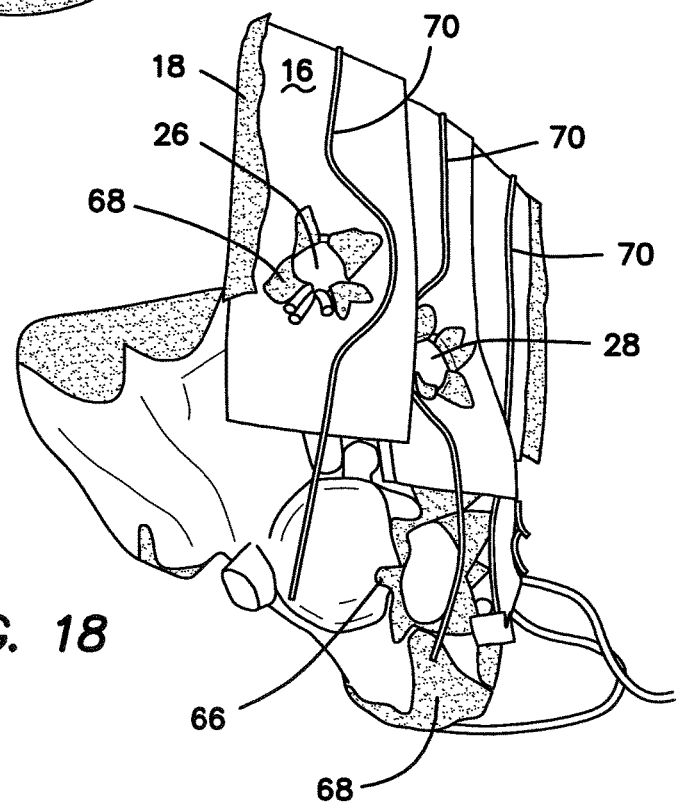
FIG. 18 is a rear top perspective view of a hernia model according to the present invention.

Turning now to FIGS. 17-21, there is shown another variation of the hernia model 10 where like reference numbers will be used to describe like parts. The hernia model 10 is substantially similar to the one described above and is configured for both practicing both the TEP and TAPP approaches. The model 10 of FIGS. 17-21 has an inner surface and an outer surface and is also substantially C-shaped in which the inner surface is concave. A simulated muscular abdominal wall 16 is connected to a simulated pelvis 66. The simulated muscular abdominal wall 16 forms approximately the top half or more of the model 10 or C-shaped curve. Instead of the bottom half or less than the bottom half of the C-shaped curve being formed by a simulated peritoneum as described above, it is formed by the simulated pelvis 66. The pelvic base 66 is molded and is shown in the figures to represent approximately half of a human pelvis approximately lateral to the midline 45 of the anatomy to illustrate a right-sided hernia model 10. The natural shape of the simulated pelvis 66 contributes to the curvature of the C-shape of the model 10. The pelvic base 66 is connected to the simulated muscular abdominal wall 16 which is made of foam material and reinforced and connected to the simulated pelvis 66 with wires 70 as can be seen in FIG. 18.

The simulated pelvis 66 is covered with a first silicone layer 68. The thin silicone layer 68 is not powdered and is cured after optionally being calendared over foam to impart the silicone layer 68 with at least one textured surface. The silicone layer 68 also covers the simulated muscular abdominal wall 16 at the inner surface. The silicone layer 68 is adhered to both the simulated pelvis 66 and to the simulated muscular abdominal wall 16 with adhesive. The silicone layer 68 is formed around, conformingly applied and adhered to the contours of both the simulated pelvis 66 and the simulated abdominal wall 16 including the first opening 26 which simulates the direct space and the second opening 28 which simulates the indirect space through which a hernia may extend. The model 10 may also be provided with a third opening that would simulate a femoral space through which the hernia may extend. The first silicone layer 68 includes two holes that are aligned with the first and second openings 26, 28. A third opening is included in the first silicone layer 68 if a third opening is formed in the simulated abdominal wall 16 to simulate a femoral space.

Figure 19:
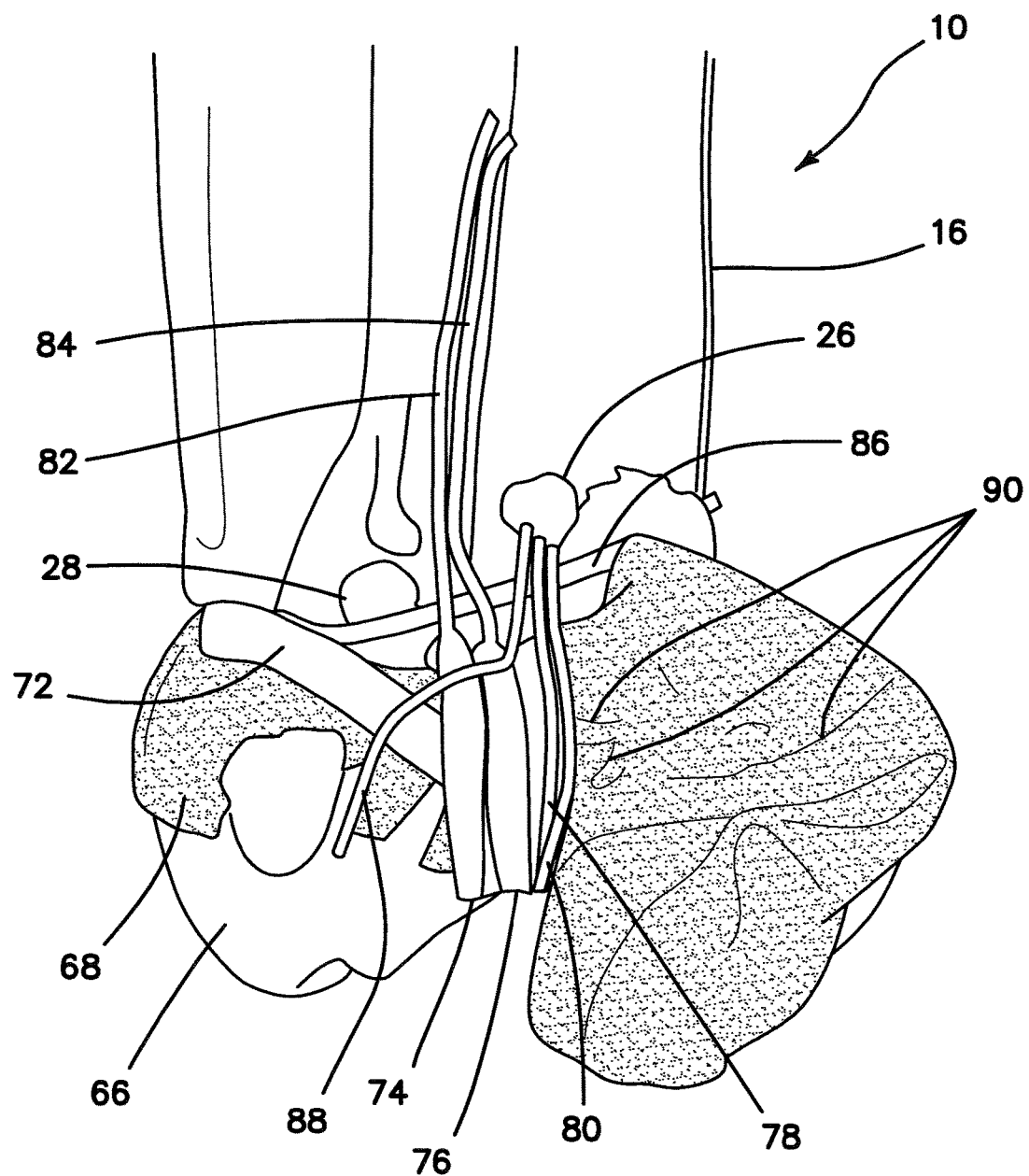
FIG. 19 is a top view of a hernia model according to the present invention.

With particular reference to FIG. 19, a variety of anatomical structures or body tissue components are overlaid onto the first silicone layer 68. Included among them is a simulated Cooper's ligament 72. The simulated Cooper's ligament 72 is made of a strip of silicone material that is white in color and overlaid onto the silicone layer 68. A white tube 86 representing the iliopubic tract is laid over the silicone layer 68. Then a simulated external iliac vein 74, simulated external iliac artery 76, simulated spermatic vein 78, simulated spermatic artery 80 are overlaid onto the silicone layer 68 and over the simulated iliopubic tract 86. A simulated epigastric vein 82 and simulated epigastric artery 84 extend upwardly from the simulated external iliac vein 74 and simulated external iliac artery 76, respectively, and are overlaid onto the silicone layer 68. The simulated abdominal wall 16 includes a first opening 26 medial to the at least one epigastric vessel 82, 84 and a second opening 28 lateral to the at least one epigastric vessel 82, 84. The model 10 includes a simulated vas deferens 88 made of translucent silicone and additional nerves 90 also made of silicone that are placed over the silicone layer 68. The end of one or more of the simulated spermatic vein 78, spermatic artery 80 and vas deferens 88 are placed inside the first opening 26.

Figure 20:
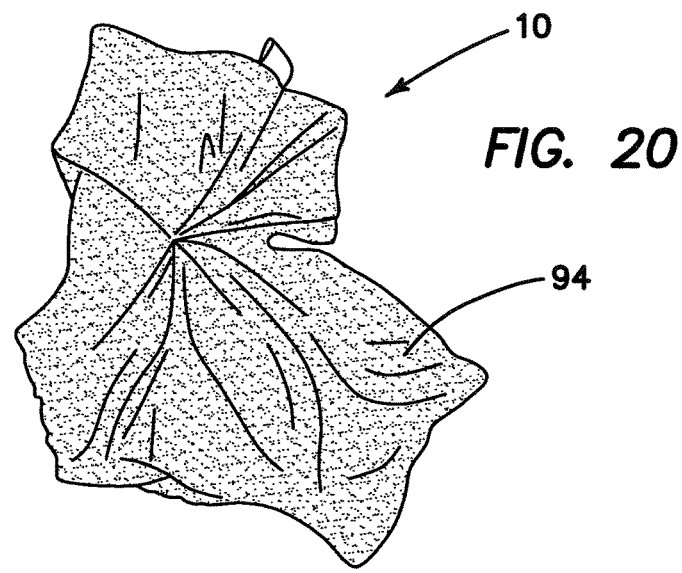
FIG. 20 is a top view of a hernia model according to the present invention.
Figure 21:
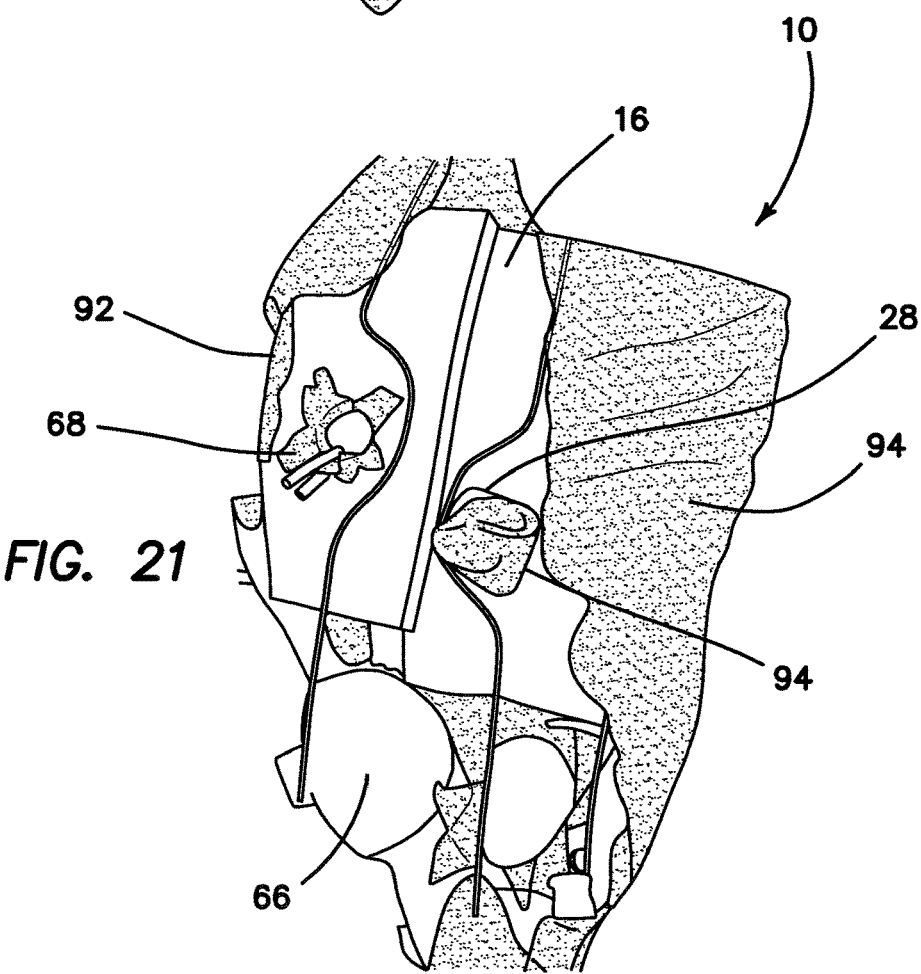
FIG. 21 is a rear top perspective view of a hernia model according to the present invention.

A second silicone layer 92 is placed over the anatomical structures to sandwich them between the first silicone layer 68 and the second silicone layer 92. The second silicone layer 92 includes two holes aligned with the two holes in the first silicone layer 68 and aligned with the first opening 26 and second opening 28. The second silicone layer 92 includes a third hole in a variation that includes a third opening aligned with a third opening in the first silicone layer 68 and third opening in the simulated abdominal wall 16 for the femoral space. The second silicone layer 92 is wrapped around the model 10 as shown in FIGS. 20 and 21 and attached with adhesive to the first silicone layer 68. The second silicone layer 92 may be selectively adhered along the edges such as to the back side of the model 10 and/or to the first silicone layer 92 between the anatomical landmarks and/or to the anatomical landmarks. In one variation, the second silicone layer 92 is attached to the spermatic vessels 78, 80 and to the vas deferens 88. The second silicone layer 92 is attached closely to the contours of the model 10 and the layer is formed through the first and second openings 26, 28 as shown in FIGS. 17-18. The second silicone layer 92 is translucent and thin and may include a textured outwardly-facing surface like the first silicone layer 68. The layer 92 is unpowdered, clear, white or pink in color.

The model 10 further includes a third layer 94 of silicone visible in FIGS. 20 and 21. The third layer 94 is configured to simulate the peritoneum. The third layer 94 is also unpowdered, thin and red in color and may include a textured outer-facing surface formed by calendaring the uncured silicone between one or more foam surfaces. The third layer 94 is pushed through one of the first or second opening 26, 28 or through the third opening that simulates the femoral space. In FIGS. 20-21, the third layer 94 is shown with a portion of the third layer 94 pushed through the second opening 28 to simulate the appearance of a hernia extending through the indirect space. The third layer 94 is attached with adhesive to the rest of the model 10. The third layer 94 is wrapped and glued around its edges to the backside of the model 10 as shown in FIG. 21. The third layer 94 may also be selectively adhered to portions of the underlying second silicone layer 92. The first silicone layer 68, second silicone layer 92 and third silicone layer 94 are all incisable with a blade and configured in thickness and tear strength to mimic real human tissue.

With the model 10 assembled as described, it is then inserted into the laparoscopic trainer 46 with the trainer 46 top cover 48 being angled or not angled with respect to its base 50 or with respect to a table top. The model 10 is inserted into the trainer 46 such that the concavity of the C-shape is positioned facing the first insert 56, apertures 58, and/or tissue simulation region 60 such that instruments inserted through these locations may readily observe or approach the concavity of the C-shape. The user will practice incising the second silicone layer 92 from the spermatic vessels, 78, 80 and vas deferens 88. With the model 10 inserted into the trainer 48, practitioners may practice resolving the hernia employing the TAPP or TEP procedures. For practicing TAPP procedures, the trainer 46 includes clips and the third layer 94 or simulated peritoneum is clipped to the surgical training device. The top cover of the surgical trainer may be angled to form an inner acute angle with respect to a horizontal plane in order to simulate a Trendelenburg positioning of the patient. The inner surface of the model faces the inner acute angle such that the inner surface of the model is approachable with instruments inserted into the internal cavity through the apertures 58 or penetrable simulated tissue region 60.

The hernia model 10 of the present invention is particularly suited for laparoscopic procedures; however, the invention is not so limited and the hernia model of the present invention can be used in open surgical procedures equally effectively.

It is understood that various modifications may be made to the embodiments of the hernia model disclosed herein. Therefore, the above description should not be construed as limiting, but merely as exemplifications of preferred embodiments. Those skilled in the art will envision other modifications within the scope and spirit of the present disclosure.

We claim:

1. An anatomical model for surgical training, comprising:
  a simulated abdominal wall located at a first end and having an inner surface and an outer surface; the simulated abdominal wall including at least one opening extending between the inner surface and the outer surface;
  a simulated peritoneum located at a second end and having an inner surface and an outer surface; the simulated peritoneum being connected and adjacent to the simulated abdominal wall such that the simulated abdominal wall and the simulated peritoneum are substantially adjacent; and
  a plurality of simulated tissue components positioned between the simulated peritoneum and the simulated abdominal wall; at least some of the simulated tissue components being adhered at least in part to at least one of, the simulated peritoneum and the simulated abdominal wall;
  wherein the model includes a curved configuration in which a cavity is defined by the simulated abdominal wall and the simulated peritoneum; and wherein at least a portion of the simulated peritoneum is removably located inside one opening in the simulated abdominal wall.

2. The anatomical model of claim 1 wherein the model includes a substantially open configuration; the model being movable between the open configuration and the curved configuration.

3. The anatomical model of claim 1 wherein the at least one simulated tissue component is at least one simulated epigastric vessel and the simulated abdominal wall includes a first opening medial to the simulated epigastric vessel and a second opening lateral to the simulated epigastric vessel.

4. The anatomical model of claim 1 wherein the simulated abdominal wall includes a first opening and a second opening.

5. The anatomical model of claim 1 wherein the simulated peritoneum includes an aperture aligned with the at least one opening in the simulated abdominal wall.

6. The anatomical model of claim 1 further including a frame configured to retain the model in a curved configuration.

7. The anatomical model of claim 1 further including a resilient spring layer configured to bias the model in the open configuration.

8. The anatomical model of claim 1 wherein the curved configuration is C-shaped.

9. The anatomical model of claim 1 further including an embedded simulated bone.

10. The anatomical model of claim 1 further including a first layer of synthetic tissue having a bottom surface and a top surface; the first layer overlaying at least a portion of the simulated abdominal wall; at least part of the first layer being adhered to the simulated abdominal wall.

11. The anatomical model of claim 1 wherein the inner surface of the simulated abdominal wall and the outer surface of the peritoneum together define a common space.

12. An anatomical model for surgical training, comprising:
a simulated abdominal wall located at a first end and having an inner surface and an outer surface; the simulated abdominal wall including a first opening and a second opening extending between the inner surface and the outer surface;
a simulated peritoneum located at a second end and having an inner surface and an outer surface; the simulated peritoneum being connected and adjacent to the simulated abdominal wall such that the simulated abdominal wall and the simulated peritoneum are substantially adjacent;
a plurality of simulated tissue components positioned between the simulated peritoneum and the simulated abdominal wall; at least some of the simulated tissue components being adhered at least in part to at least one of the simulated peritoneum and the simulated abdominal wall;
wherein the model includes a curved configuration in which a cavity is defined by the simulated abdominal wall and the simulated peritoneum; and
a simulated bowel; at least a portion of the simulated bowel is removably inserted into one of the first opening and second opening.

* * * * *